(12) United States Patent
Tarabuso et al.

(10) Patent No.: US 8,517,658 B2
(45) Date of Patent: Aug. 27, 2013

(54) DEVICE FOR RAISING AND LOWERING THE SPARE WHEEL OF A VEHICLE

(75) Inventors: Mario Tarabuso, Turin (IT); Carlo Otelli, Turin (IT); Nicola Giorgio Pino, Caserta (IT)

(73) Assignee: PROMA S.p.A., Nicola La Strada (CE) (IT)

( * ) Notice: Subject to any disclaimer, the term of this patent is extended or adjusted under 35 U.S.C. 154(b) by 718 days.

(21) Appl. No.: 12/597,439

(22) PCT Filed: Apr. 24, 2008

(86) PCT No.: PCT/IB2008/001043
§ 371 (c)(1),
(2), (4) Date: Jan. 28, 2010

(87) PCT Pub. No.: WO2008/132595
PCT Pub. Date: Nov. 6, 2008

(65) Prior Publication Data
US 2010/0143085 A1    Jun. 10, 2010

(30) Foreign Application Priority Data
Apr. 27, 2007 (IT) .............................. TO2007A0287

(51) Int. Cl.
*B62D 43/04* (2006.01)
*B62D 43/00* (2006.01)
*B66D 1/54* (2006.01)

(52) U.S. Cl.
USPC .......................................... 414/463; 254/407

(58) Field of Classification Search
USPC .............. 114/210; 212/168, 234; 224/42.12, 224/42.23; 242/157 R; 254/323, 362, 397, 254/403, 404, 407, 414–416; 414/463, 464, 414/466
See application file for complete search history.

(56) References Cited

U.S. PATENT DOCUMENTS

| 1,392,687 | A | * | 10/1921 | Johnston | 254/397 |
| 1,640,672 | A | * | 8/1927 | Schauman | 114/210 |
| 2,927,772 | A | * | 3/1960 | Kanouse | 254/323 |
| 3,542,413 | A |   | 11/1970 | Hardison | |
| 3,554,397 | A | * | 1/1971 | Cluff | 414/463 |
| 2004/0071536 | A1 |   | 4/2004 | Tiar | |

FOREIGN PATENT DOCUMENTS

| DE | 198 41 281 | 3/2000 |
| EP | 1 577 197 | 9/2005 |

* cited by examiner

*Primary Examiner* — Gregory Adams
(74) *Attorney, Agent, or Firm* — Merchant & Gould P.C.

(57) ABSTRACT

A device for raising and lowering a spare wheel (R) of a vehicle includes an actuation device (14), a flexible cable (16) co-operating with the actuation device (14), and an engagement member (18, 85) fixed to one end of the flexible cable (16). The device further includes a transmission member (22, 78) fixed with respect to the structure (12) of the vehicle and having a substantially cylindrical shape, arranged with its own longitudinal axis horizontal. The flexible cable (16) co-operates with a curved outer surface (28, 79) of the transmission member (22) from which it is deviated substantially by 90° around the transmission member (22); the engagement member (18, 85) has a bar with a horizontal axis (83) fixed to one end of the flexible cable (16), the bar being designed to engage in a fixed transverse seat (30, 76) made on top of the transmission member (22, 78) for stable anchorage of the wheel (R) to the structure of the vehicle (12) when the wheel is in the completely raised position.

11 Claims, 10 Drawing Sheets

DEVICE FOR RAISING AND LOWERING THE SPARE WHEEL OF A VEHICLE

This application is a National Stage Application of PCT/IB2008/001043, filed 24 Apr. 2008, which claims benefit of Serial No. TO2007A000287, filed 27 Apr. 2007 in Italy and which applications are incorporated herein by reference. To the extent appropriate, a claim of priority is made to each of the above disclosed applications.

The present invention relates to a device for raising and lowering the spare wheel of a vehicle.

In the case of vehicles equipped with a spare wheel of large dimensions, such as for example vans, offroad vehicles and the like, the spare wheel is generally positioned on the outside, underneath the rear luggage compartment of the vehicle. In general, the spare wheel is set horizontal in the proximity of the rear bumpers of the vehicle. In these cases, since they are generally spare wheels of considerable dimensions and weight, the vehicle is equipped with a device that enables raising and lowering of the spare wheel. Devices of a known type envisage a manual-control actuation device via which the user controls, via a flexible cable, raising and lowering of the wheel. For reasons of safety, said devices must be provided with a clamping system for withholding the wheel stably in the raised position.

The main drawback of the solutions of a known type is represented by the high cost of the actuation device, basically due to the complexity of the system that enables clamping of the wheel in the raised position to be obtained.

The purpose of the present invention is to provide a device for raising and lowering the spare wheel of a vehicle that is simpler and less costly than devices of a known type.

The characteristics and advantages of the device according to the present invention will emerge clearly in the course of the ensuing detailed description, provided purely by way of non-limiting example, with reference to the attached plates of drawings, in which.

Figure 1:
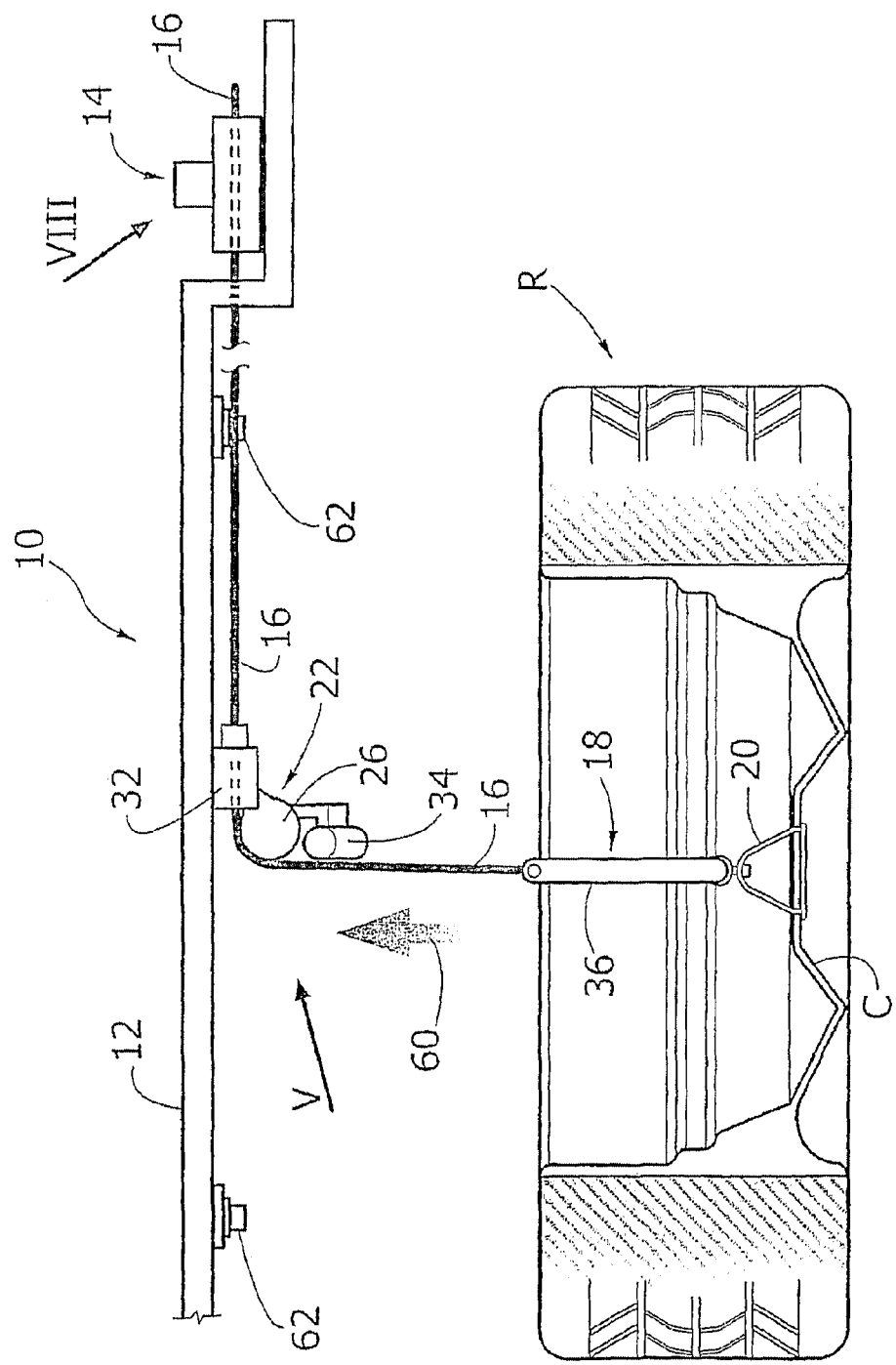
FIGS. 1, 2 and 3 are schematic side views illustrating a first embodiment of the device according to the present invention in three different operating positions.

With reference to FIG. 1, the reference number 10 designates a device for raising and lowering the spare wheel R of a vehicle. Designated as a whole by 12 in FIG. 1 is the fixed structure of the vehicle. In the example represented schematically in the figures, the fixed structure 12 is for example constituted by the end wall of the rear loading compartment of the vehicle.

The device 10 according to the present invention comprises an actuation device 14 housed, for example, within the loading compartment. As will be described in greater depth in what follows, the actuation device 14 enables control of the movement of a flexible cable 16, by means of which raising and lowering of the wheel R is governed. The flexible cable 16 is fixed at one of its ends to an engagement member 18 provided with an element 20 that is shaped so as to engage a central hole of the rim C of the wheel R.

With reference in particular to FIGS. 4 to 7, the device 10 comprises a transmission member 22 fixed with respect to the structure 12 of the vehicle. The transmission member 22 is made up of a metal body substantially shaped like a cylinder with horizontal axis, with a curved lateral surface 24 and two plane front surfaces 26 parallel to one another. On the curved surface 24 a groove 28 is made that functions as guide for the flexible cable 16. The transmission member 22 has a top surface 30 that functions as housing seat for retention in the raised position of the engagement member 18. The transmission member 22 can be, for example, fixed to a base 32, which is, in turn, fixed to the bottom surface of the horizontal end wall 12 of the loading compartment. The base 32 can be provided with a hole, through which the flexible cable 16 extends.

Figure 4:
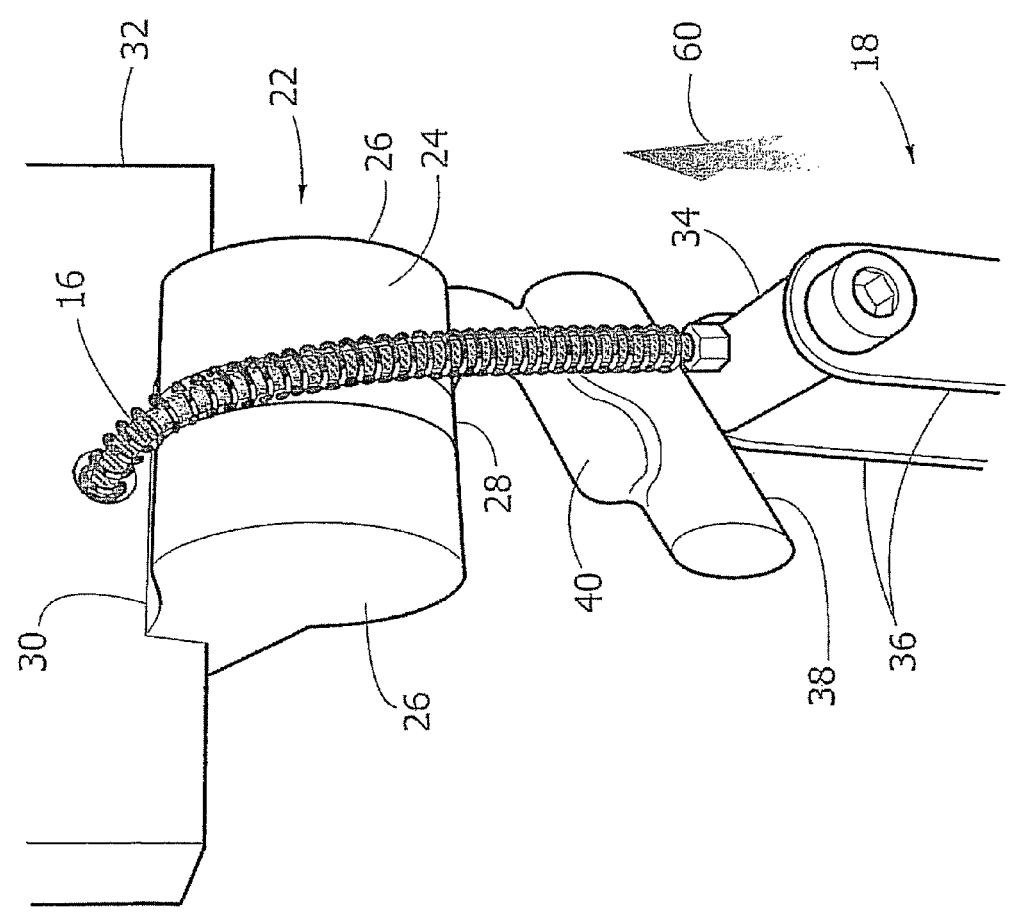
FIGS. 4, 5, 6 and 7 are perspective views in greater detail of the part indicated by the arrow IV in FIG. 1, illustrating the sequence of raising of the wheel.
Figure 5:
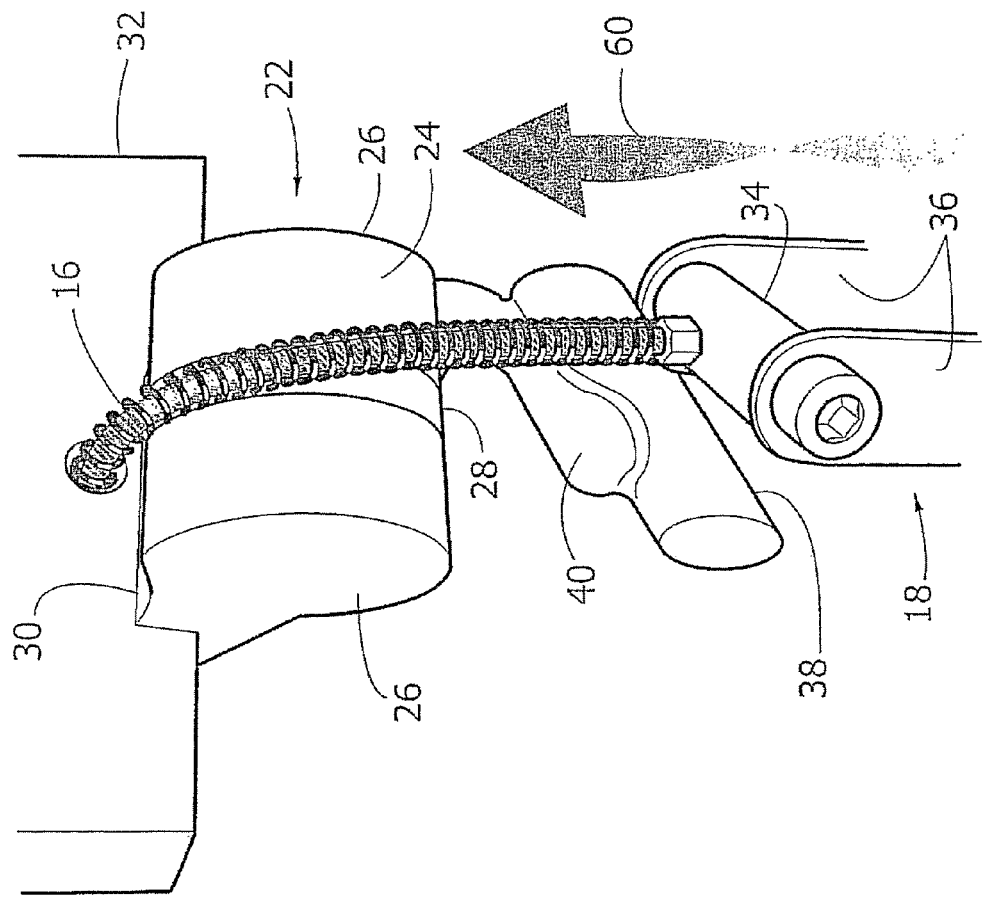
Figure 6:
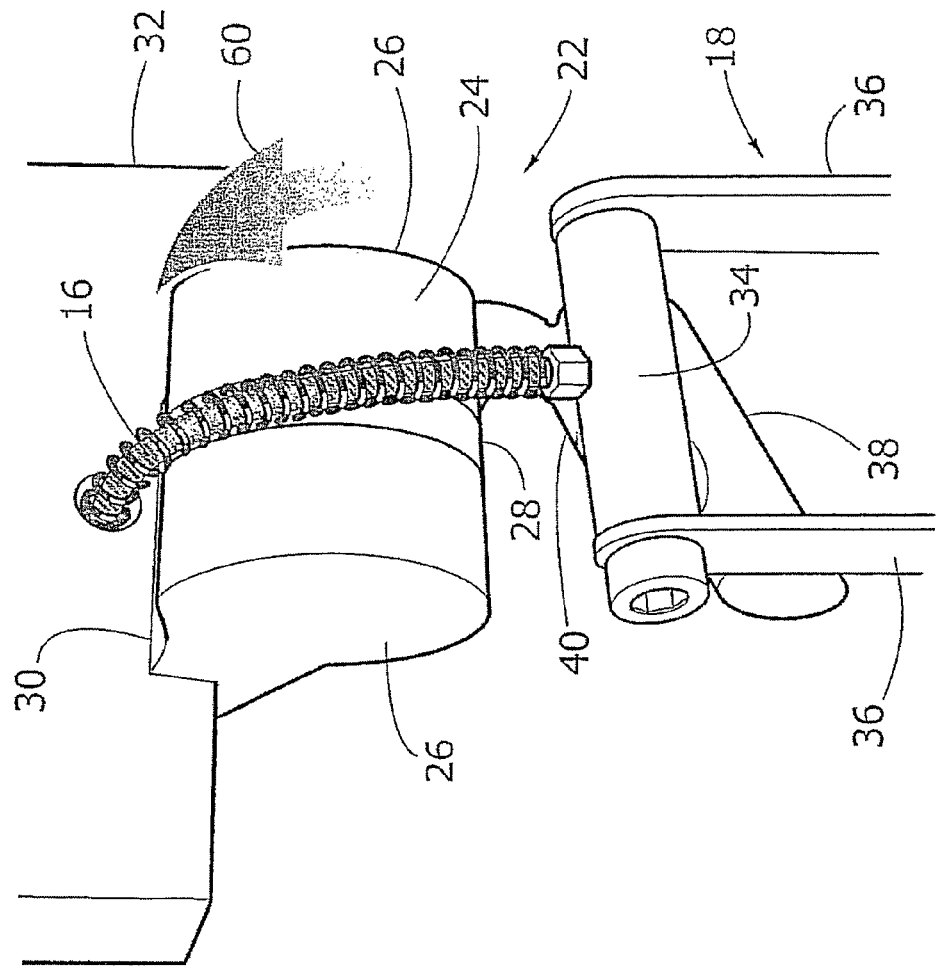

As may be seen in FIGS. 4, 5 and 6, the cable 16 co-operates with the guide 28 formed on the arched surface 24 of the transmission member 22 and is deviated substantially by 90° around the transmission member 22.

Figure 2:
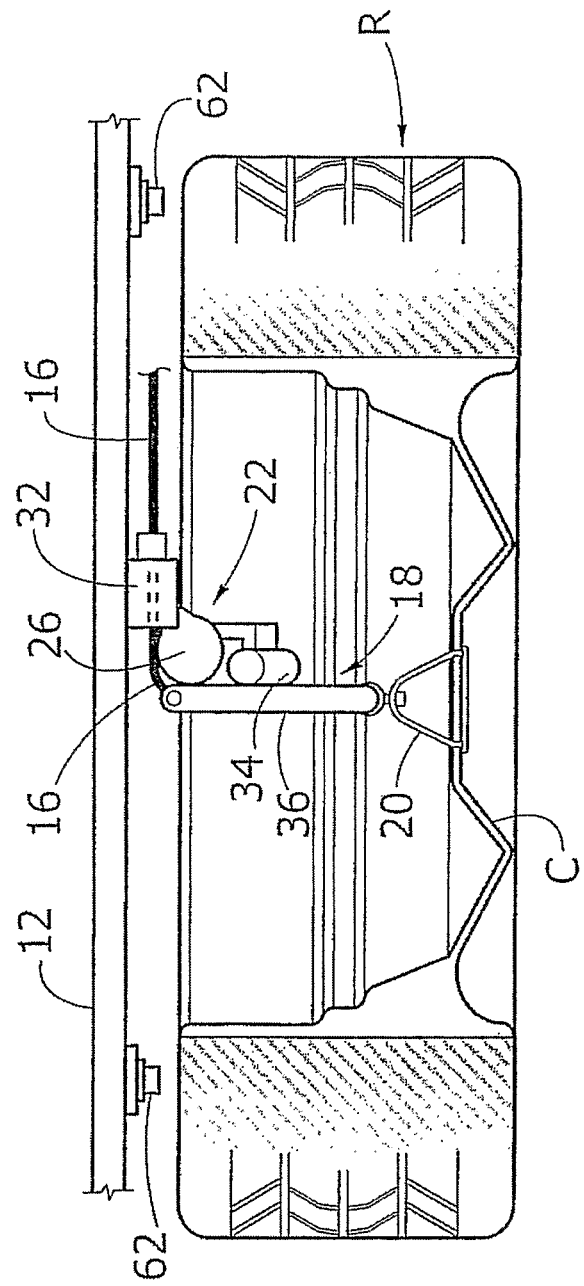
Figure 3:
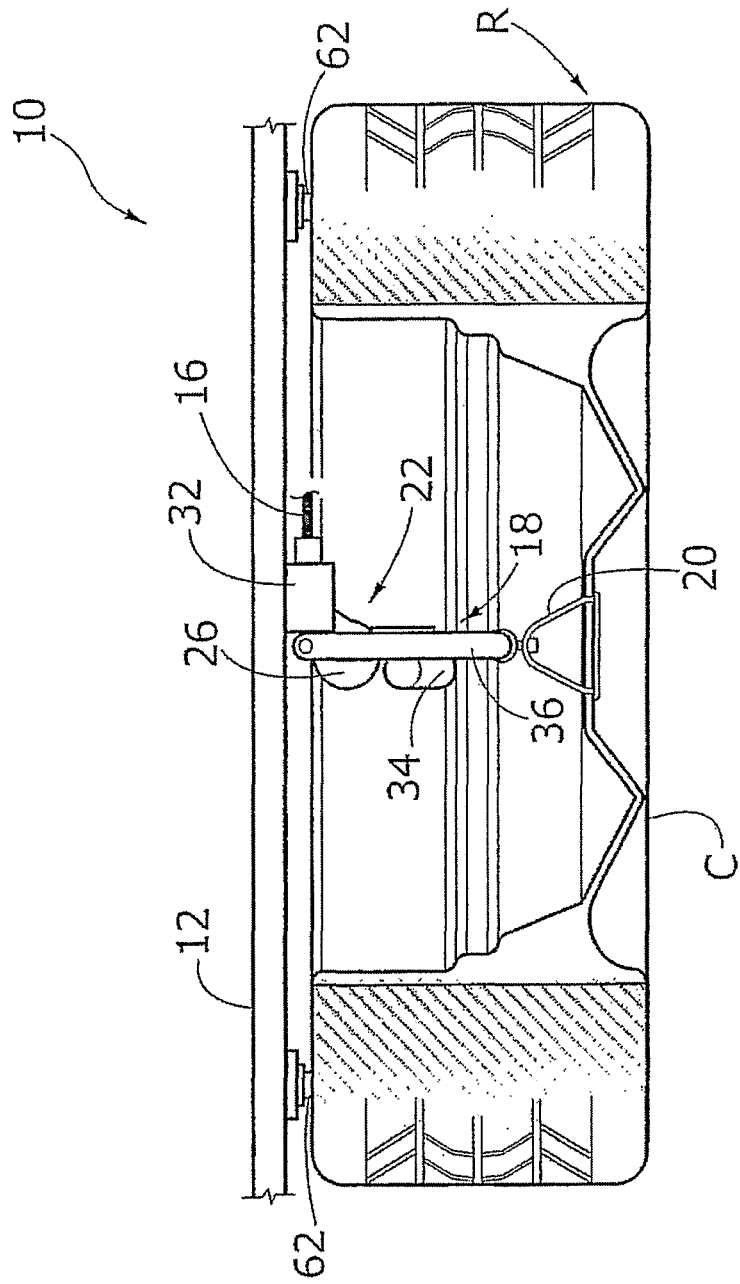

With reference to FIGS. 4-7, the engagement member 18 comprises a bar with horizontal axis 34, preferably having the shape of a cylindrical pin with circular cross section. The bar 34 is fixed at the two opposite ends to two elongated plates 36 that extend in the vertical direction. At their bottom end, the elongated plates 36 are fixed to a second bar (not illustrated), which is in turn fixed centrally to the element 20 (FIGS. 1-3) that has the function of engaging the rim C of the wheel R. The top bar 34 of the engagement member 18 is fixed to the bottom end of the flexible cable 16 in a central position between the two elongated plates 36.

Once again with reference to FIGS. 4 to 7, the device according to the present invention is advantageously provided with an orientation element 38 designed to orient the engagement member 18 automatically with respect to the transmission member 22 during raising of the wheel.

The orientation element 38 is preferably constituted by a metal element substantially shaped like a pin fixed underneath the transmission member 22. The orientation element 28 extends from top to bottom and is comprised between two planes passing through the front ends 16 of the transmission member 22. In the example of embodiment illustrated in the figures, the orientation element 38 is fixed to the bottom surface of the transmission member 22 by means of an appendage 40 welded to the orientation element 38 and to the transmission member 22.

Figure 8:
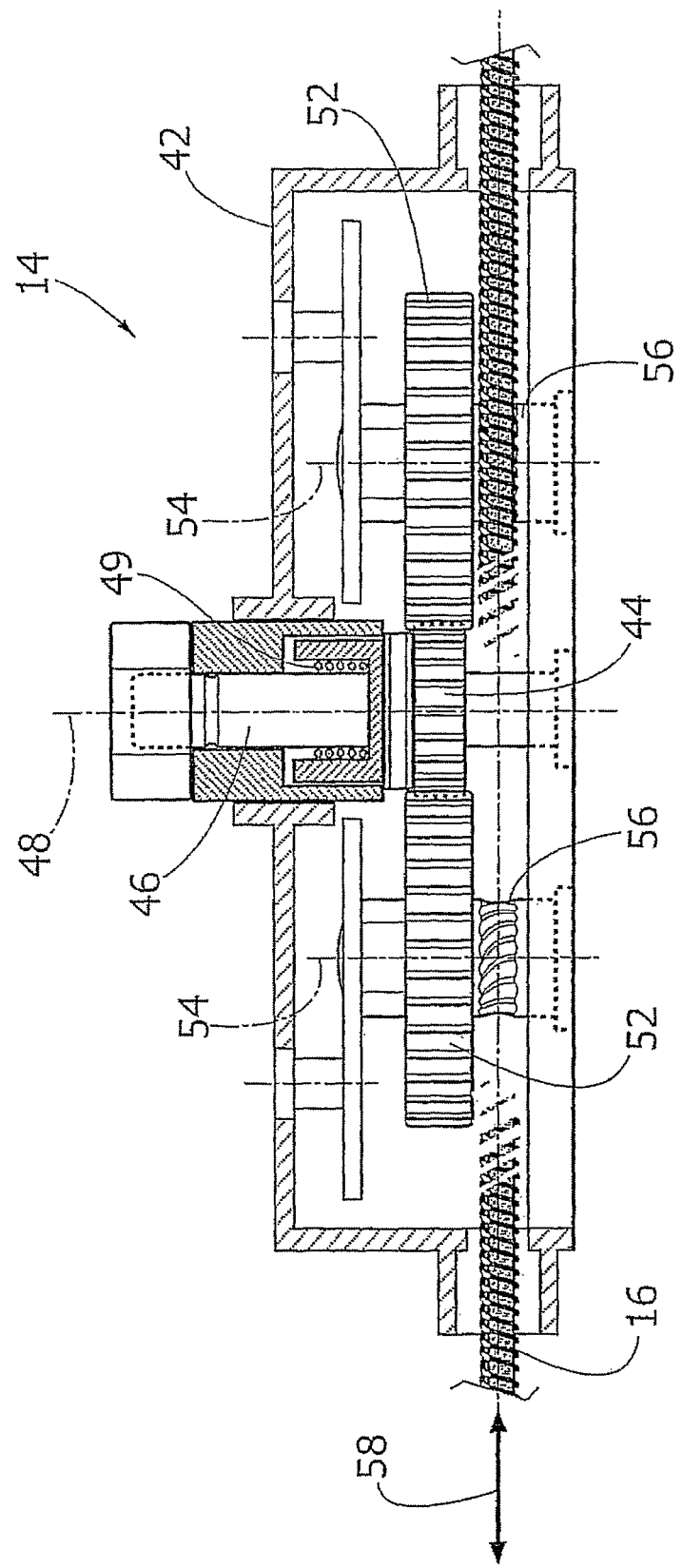
FIG. 8 is a schematic cross section of an actuation device indicated by the arrow VIII in FIG. 1.

With reference to FIG. 8, the actuation device 14 comprises a casing 42 mounted inside which so that it can turn is a first gear 44 fixed with respect to an actuation shaft 46. The shaft 46 can be actuated in rotation about its own axis 48 by means of a spanner, preferably by means of the same spanner that serves for screwing and unscrewing the screws for fixing the wheels. The actuation shaft 46 is preferably associated to a spring brake 49.

The first gear 44 meshes with two second gears 52 which are able to rotate about respective axes 54 parallel to the axis of rotation 48 of the first wheel 44.

The flexible cable 16, as illustrated in particular in FIGS. 4 to 6, is a helical flexible cable. Said cable is provided on its outer surface with a metal wire wound in a helix, fixed on the internal surface of a cable with internal ?strands. The flexible cable 16 is able to slide within of a guide sheath (not illustrated) fixed with respect to the structure 12. The sheath is preferably made as described in the Italian patent application No. TO2006A000271 filed in the name of the present applicant. This type of sheath is particularly suitable in this application since it enables transmission of forces of considerable intensity necessary for raising heavy wheels weighing up to 40 kg.

The outer helical surface of the cable 16 co-operates with two helical gears 56, which are fixed and coaxial with respect to the second gears 52. The cable 16 is kept meshed with the helical gears 56, for example by means of a fixed contrast surface of the casing 42 that defines a compartment for sliding of the cable 16 along a path of meshing with the helical gears 56.

Rotation, by means of a spanner, of the first gear 44 enables movement of the flexible cable 16 in the direction indicated by the double-headed arrows 58 in FIG. 8.

FIGS. 1 to 3 and 4 to 7 illustrate the sequence of raising of the wheel R.

Starting from the configuration in which the wheel R is lowered, for example after replacement of a punctured wheel, the engagement device 18 is engaged to the rim C of the wheel R when the wheel R rests on the ground in a horizontal position. Then, the actuation device 14 is actuated in the direction corresponding to raising of the wheel. The wheel is thus raised in the direction indicated by the arrow 60 in FIG. 1, with the terminal stretch of the flexible cable 16 that extends in the vertical direction tangential to the curved surface 24 of the transmission member 22. The engagement member 18 will have a generic orientation with respect to a vertical axis.

With reference to FIG. 4, proceeding with raising of the wheel R, the bar 34 (oriented in a generic way with respect to a vertical axis) comes into contact with the orientation element 38. The inclined position of the orientation element 38 causes, as the movement of the flexible cable 16 proceeds in the direction of raising, the top bar 34 of the engagement member 18 to rotate about a vertical axis as illustrated in FIGS. 5 and 6 until the bar 34 sets itself with its own longitudinal axis parallel to the longitudinal axis of the transmission member 22 (position illustrated in FIG. 6).

Figure 7:
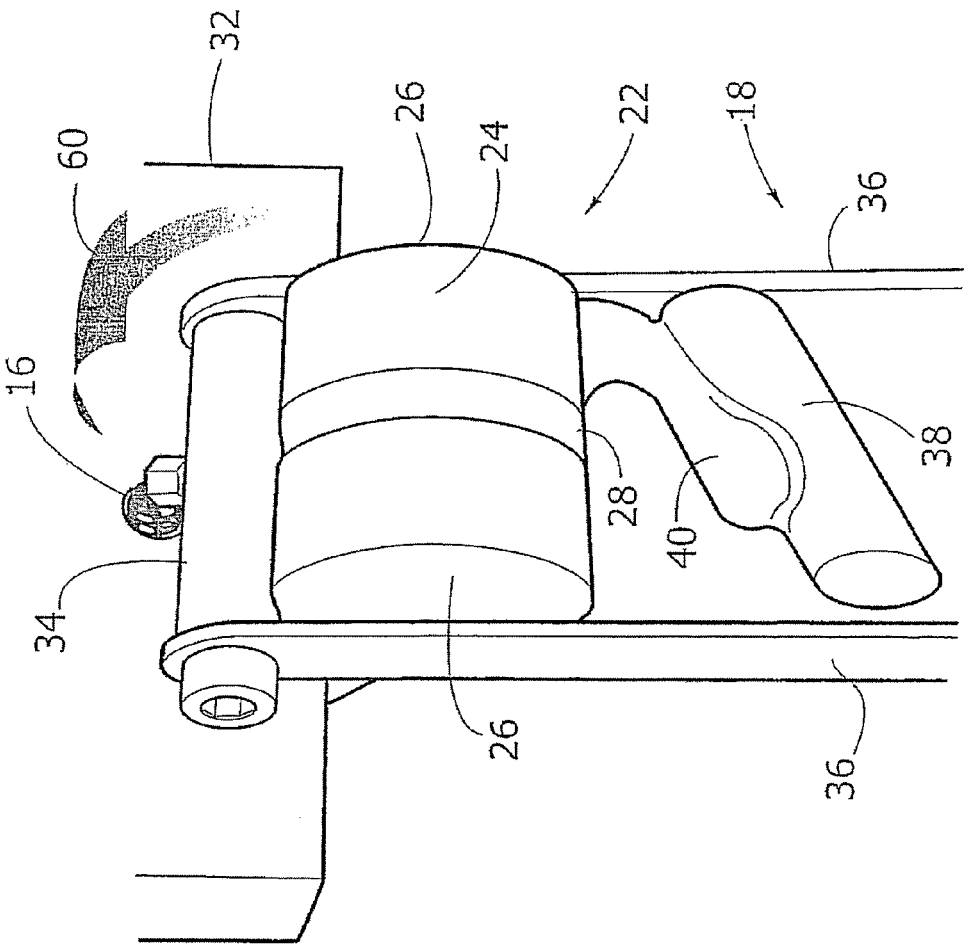

Continuing further with the movement of the cable 16 in the direction of raising, the top bar 34 passes over the transmission member 22, sliding on the curved surface 24 of the transmission member 22 until it comes into engagement in the seat 30 provided on the top part of the transmission member 22. The seat 30 is in a position slightly lower than the top of the curved surface 24. As illustrated in FIG. 7, the two elongated plates 36 of the engagement member 18 set themselves on the outside of the transmission member 22, parallel to the front surfaces 16 of the latter.

In the position where the top bar 34 engages the seat 30, the engagement member 18 is withheld in a stable position by the transmission member 22. This position corresponds to the one illustrated in FIG. 3, where the wheel R is kept in a horizontal position underneath the end surface 12. Preferably, in this position the tyre of the wheel R is pressed against a series of positioning elements 62 fixed on the underside of the wall 12.

In order to lower the wheel, the actuation device 14 is actuated in the opposite direction. The movement of the cable 16 in the direction of lowering of the wheel causes disengagement of the top bar 34 from the transmission member 22. The helical cable 16 is provided with a very high force of thrust as compared to normal flexible cables. This enables the bar 34 to be pushed out of engagement with the respective seat 30.

It will be understood that the device according to the present invention enables the wheel R to be withheld stably in the raised position, without the need to provide auxiliary anchorage devices or systems. Engagement and disengagement of the bar 34 with the respective seat 30 occur automatically with actuation of the device 14. This enables considerable simplification of the structure of the actuation device 14 as compared to known solutions since it is not necessary to envisage devices for controlling the mechanisms of engagement designed to withhold the wheel securely in the raised position.

Figure 9:
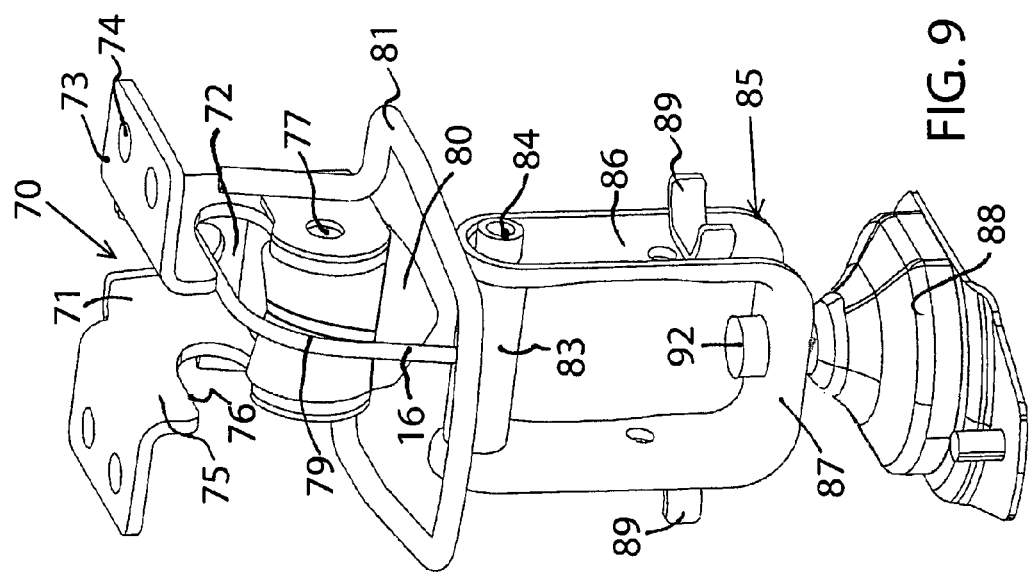
FIGS. 9, 10 and 11 are schematic perspective views illustrating a second embodiment of the device according to the present invention in three different operating positions.
Figure 10:
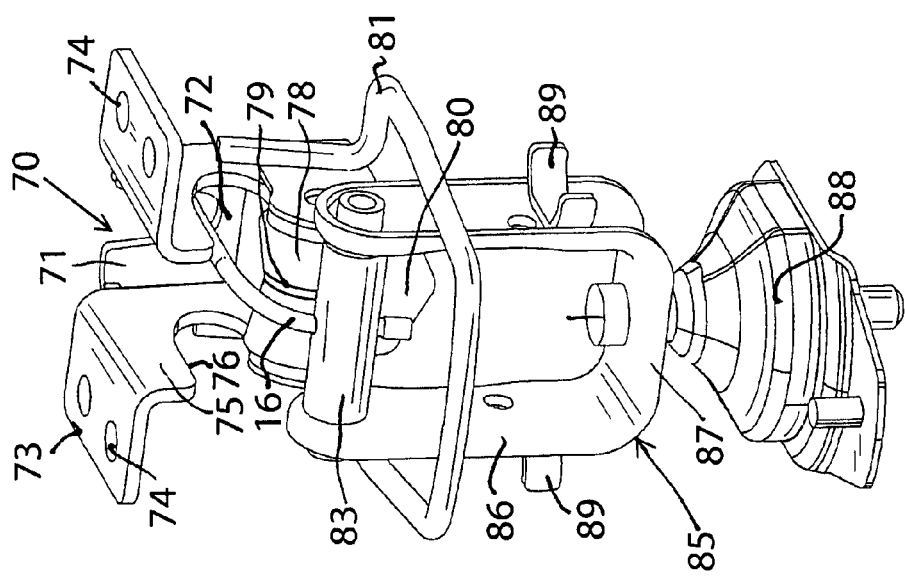
Figure 11:
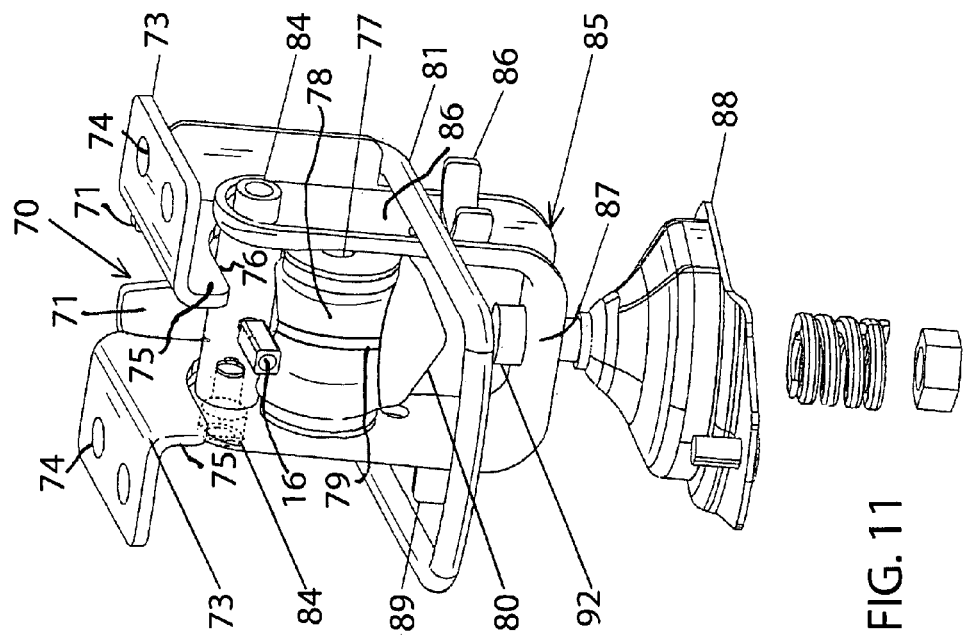

Illustrated with reference to FIGS. 9, 10 and 11 is a second embodiment of the device according to the invention, without this implying any change in the actuation device 14 previously described and illustrated in FIG. 8.

The device for raising a spare wheel, in this second embodiment, has a supporting bracket 70 constituted by two rear plates 71 joined by a cross member 72 and forming two bent-back edges 73 set in the same plane and provided with holes 74 for fixing the bracket 70 and the entire device connected thereto to the fixed structure 12 of the vehicle (see FIG. 1).

The bent-back edges 73 extend vertically with respective plates 75 provided with lead-in grooves 76 and holes 77 for fixing of a transmission member 78. The latter has the shape of two truncated cones coupled on their minor base in such a way as to form a groove 79 in the middle.

At the bottom, extending from the transmission member 78 is an orientation element 80 in the form of a conical buffer.

Also constrained to the rear brackets 71 of the supporting bracket 70 is a containment rod 81.

The engagement member 82, fixed to the flexible cable 16 is constituted by a horizontal bar 83 in the form of a cylinder fixed at its ends 84 to the top ends of the sides 86 of a U-shaped plate 85.

The cross member 87 of the plate 85 (through a pin 92) carries constrained thereto the bell 88 for supporting the rim C of the wheel R (see FIG. 1).

Also welded along the sides 86 of the U-shaped plate 85 are two substantially C-shaped safety brackets 89.

Operation of the device is described in what follows.

Starting from the condition in which the wheel is lowered (FIG. 1), the flexible cable 16 is actuated by means of the device 14 (FIG. 8) exactly as in the case of the first embodiment.

The cable draws upwards the wheel R with the raising device 82 until this comes into the proximity of the bracket 70 (see FIG. 9).

As the device 82 proceeds to return upwards, the pin 83 of the plate 85 comes into contact with the buffer 80, which orients the pin automatically; i.e., the wheel is in the position (see FIG. 10) such that, as raising proceeds, the ends 84 of the pin 83 slide into the lead-in grooves 76 of the bracket 70 (see FIG. 11).

In this position, the wheel R is stably clamped in the raised position with the cable 16 in tension pressed against the groove 79 of the transmission 78, which determines correct positioning thereof.

At the moment of release of the wheel R the cable 16 unwinds, and this causes the pin 83 to pass beyond the lead-in seats 76 (see FIG. 10) so that the U-shaped bracket 85 can drop downwards until the wheel R comes to rest on the ground.

The containment rod 81 of the U-shaped bracket 85 prevents any excessive oscillations of the raising device both during raising and during lowering of the wheel, a fact that would move the pin 83 away from the triangular buffer 80, which, instead, should orient the pin 83 so that this will be inserted correctly in the seats 76 of the bracket 70.

The lateral safety brackets 89 prevent, during driving, on account of accidental jolting of the vehicle, the raising device 82 from possibly being released autonomously, i.e., prevent the pin 83 from coming out of the seats 76 of the bracket 70 with the result that the wheel would hang down without any stable constraint.

In fact, the contrast elements 89, in the case of oscillations of the device, come to bear upon the rod 81 and prevent the aforesaid accidental release of the pin 83 from the seats 76.

Figure 12:
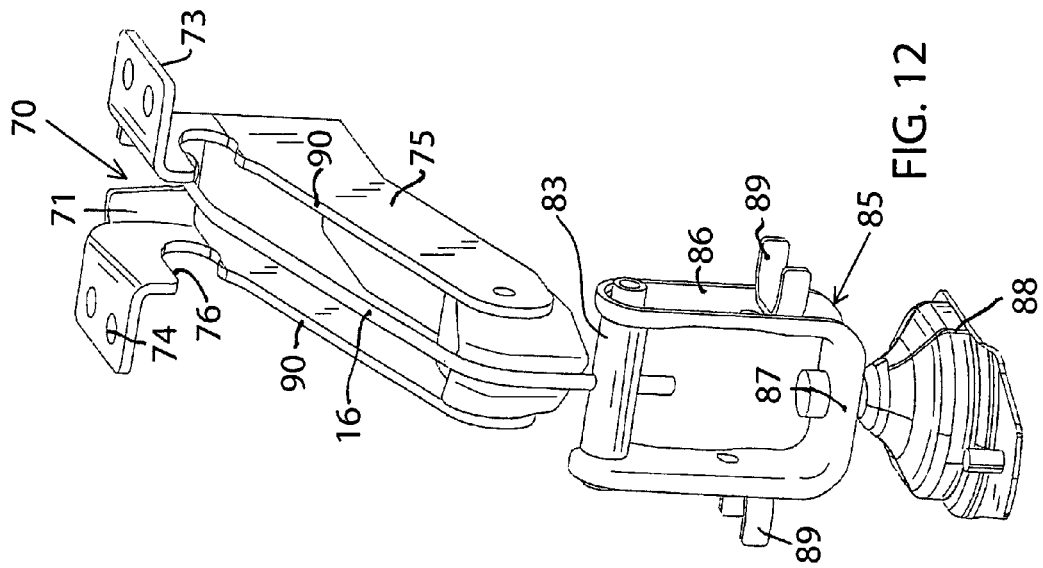
FIG. 12 is a perspective view of the solution of FIGS. 9-11 in a further variant embodiment.

FIG. 12 illustrates a variant of the embodiment of FIGS. 9-11; namely, this variant is suitable when the wheel, in addition to having to be raised and lowered, also has to be translated sideways because there are structural elements of the vehicle that require installation of the raising device in a position that does not enable simple raising and lowering of the device itself.

In this case, as may be seen in FIG. 12, the plates 75 of the bracket 70, instead of bringing the transmission member 78 into the immediate vicinity (underneath) the lead-in grooves 76 for the bar 83, extend in obliquely for a length substantially equal to the internal radius of the spare wheel.

In this way, the wheel during raising is guided on the top surfaces 90 of the plates 75, thus avoiding cross members or axle-shafts that would render the bracket 70 inaccessible if there were not this translation during raising.

Of course, without prejudice to the principle of the invention, the details of construction and the embodiments may vary widely with respect to what is described and illustrated herein, without thereby departing from the scope of the invention as defined by the ensuing claims.

The invention claimed is:

1. A device for raising and lowering a spare wheel of a vehicle, comprising:
   an actuation device;
   a flexible cable co-operating with the actuation device; and
   an engagement member fixed to one end of the flexible cable;
   a transmission member fixed with respect to the vehicle and having a substantially cylindrical shape with a horizontal; the flexible cable co-operating with a curved outer surface of the transmission member from which it is deviated substantially by 90° around the transmission member; the engagement member comprising a bar with horizontal axis fixed to one end of the flexible cable, said bar being designed to engage in a fixed transverse seat made on top of the transmission member for stable anchorage of the wheel to the when the wheel is in a completely raised position;
   wherein the engagement member comprises a U-shaped element having two elongated plates extending in the vertical direction and fixed at an opposite end to said bar and connected by a cross member fixed to a bell for supporting the wheel.

2. The device according to claim 1, wherein the fixed transverse seat (30) is made directly on the transmission member.

3. The device according to claim 1, wherein the transmission member comprises an orientation element formed by a pin-shaped element fixed on the underside of the transmission member and set inclined from top to bottom so as to orient the bar parallel to the longitudinal axis of the transmission member during raising of the wheel.

4. The device according to claim 1, wherein the transmission member has the shape of a double truncated cone with minor bases set facing one another and is provided at the bottom with an orientation element formed by an appendage shaped like a truncated cone such as to orient the bar parallel to the longitudinal axis of the transmission member during raising of the wheel.

5. The device according to claim 1, wherein the transmission member is fixed to a bracket and the bracket is fixed to the vehicle, and the fixed transverse seat is made in said bracket in the form of stable lead-in portion for the bar.

6. The device according to claim 1, wherein fixed to the bracket is a rod, which surrounds at a distance the engagement member to prevent impact and lateral oscillations.

7. The device according to claim 6, wherein fixed to the engagement member are means for coming to bear upon the rod in the case of jolting of the vehicle to prevent accidental disengagement of the bar from the seat.

8. The device according to claim 5, wherein the bracket is provided with plates supporting the transmission member immediately beneath lead-in portions for the bar.

9. A device for raising and lowering a spare wheel of a vehicle, comprising:
   an actuation device;
      a flexible cable co-operating with the actuation device; and
      an engagement member fixed to one end of the flexible cable;
   a transmission member fixed with respect to the vehicle and having a substantially cylindrical shape with a horizontal; the flexible cable co-operating with a curved outer surface of the transmission member from which it is deviated substantially by 90° around the transmission member; the engagement member comprising a bar with horizontal axis fixed to one end of the flexible cable, said bar being designed to engage in a fixed transverse seat made on top of the transmission member for stable anchorage of the wheel to the when the wheel is in a completely raised position;
      wherein the transmission member is fixed to a bracket and the bracket is fixed to the vehicle, and the fixed transverse seat is made in said bracket in the form of stable lead-in portion for the bar; and
      wherein the bracket is provided with plates that support the transmission member; the plates extend in obliquely at a distance from the lead-in portions for a length substantially equal to the internal radius of the spare wheel and guide the bar in the direction of the lead-in portions causing the bar to slide on their top surfaces.

10. The device according to claim 1, wherein the flexible cable is a helical cable.

11. The device according to claim 1, wherein the actuation device comprises at least one helical gear that meshes with the outer surface of the flexible helical cable.

* * * * *